(12) United States Patent
Shirwadkar

(10) Patent No.: US 7,788,262 B1
(45) Date of Patent: Aug. 31, 2010

(54) METHOD AND SYSTEM FOR CREATING CONTEXT BASED SUMMARY

(76) Inventor: Sanika Shirwadkar, 1541 Wycliffe, Irvine, CA (US) 92602

( * ) Notice: Subject to any disclaimer, the term of this patent is extended or adjusted under 35 U.S.C. 154(b) by 515 days.

(21) Appl. No.: 11/833,972

(22) Filed: Aug. 4, 2007

Related U.S. Application Data (60) Provisional application No. 60/821,396, filed on Aug. 4, 2006.

(51) Int. Cl.
*G06F 7/00* (2006.01)
(52) U.S. Cl. .............................. 707/737; 707/602; 704/9
(58) Field of Classification Search ........................ None
See application file for complete search history.

(56) References Cited

U.S. PATENT DOCUMENTS 5,774,845 A * 6/1998 Ando et al. .................. 704/231
7,117,207 B1 * 10/2006 Kerschberg et al. ............. 707/5
2003/0130837 A1 * 7/2003 Batchilo et al. ................. 704/9

* cited by examiner

*Primary Examiner*—Charles Rones
*Assistant Examiner*—Belix M Ortiz (57) ABSTRACT

A method and system for generating electronic data summary based on context and semantics of the document and its subsequent usage is disclosed. The method and system provides for generating a taxonomy of concepts, assigning unique-identifiers and weights to the taxonomy concepts using a given corpus of electronic data, using the taxonomy to identify the semantics of the document to be summarized, selecting text from a given document based on the weights of unique-identifiers in the taxonomy, generation of a list of semantic-structures and pruning of the list based upon an entropy threshold, generation of summary from the list of semantic-structures, generation of a topic summary from a given list of similar summaries, publishing of the summary in a known format, and usage of the summary to prevent denial of information.

18 Claims, 7 Drawing Sheets

GENERATION OF A DOCUMENT SUMMARY

Figure 1: GENERATION OF A DOCUMENT SUMMARY

Figure 2: EXAMPLE OF FIGURE 1, AS APPLIED TO THE WEB PAGES DOCUMENTS ON A COMPUTING DEVICE Figure 3: EXAMPLE OF FIGURE 1, AS APPLIED TO A SECURE WEB BROWSER / SEARCH ENGINE EXPERIENCE Figure 4: FLOWCHART OF STEPS PERFORMED FOR STORING UNIQUE-IDENTIFIERS AGAINST THE ROOT WORDS OF TAXONOMY

Figure 5

Figure 6: FLOWCHART OF STEPS PERFORMED BY A BROWSER OR A SEARCH ENGINE WHEN FETCHING A URI BASED ON A USER REQUEST / QUERY Figure 7: A GENERAL COMPUTER SYSTEM

METHOD AND SYSTEM FOR CREATING CONTEXT BASED SUMMARY

CROSS-REFERENCE TO RELATED APPLICATIONS

This application claims the benefit of PPA Ser. No. 60/821,396, filed on Aug. 4, 2006 by the present inventor, which is incorporated by reference.

TECHNICAL FIELD

The present invention relates generally to computer software systems. In particular, an embodiment of the invention relates to a method and system for generating and using summary of electronic data for quicker information dispersal.

BACKGROUND ART

Electronic data (documents containing text, and textual captions/tags parts of audio/video/images etc.) usually contains 'meta-data', i.e. data describing data, generated to help readers understand what is described in the document. This meta-data, is generated using the title of the document, the keywords that are used in the document, or using some of the sub-titles/headings of the document. This meta-data can then be embedded in the document as its property (for example, Microsoft Word documents have a property which can store document related information). However, the problem of this approach is that the keywords may not give the entire idea about the contents of the document.

Keywords/sub-titles may also mislead a human reviewer. For example, the human reviewer may infer that a document talks about "Shakespeare's Hamlet", based on the keywords—"Shakespeare", "Hamlet". However, the document may be just having a single sentence about "Shakespeare" and "Hamlet", and may contain other text that is not related to either "Shakespeare" or "Hamlet". Another problem of this approach is that a human author needs to identify the keywords associated with the document; the sub-titles associated with the document and add that as a property of the document. This needs to be done manually, which may cause concerns such as human time consumption, labor cost, possibility of manual errors, etc.

In certain documents for the web (i.e. web pages), search engines derive all the words used in the web documents (i.e. web pages), and index the document based on the words. In this way the words of the document become the meta-data for the document. This meta-data then works as an index for a user, who wants to understand the document without going over the details of the document. In this case, the web search engine may index the document based on certain keywords that do not have much relevance in terms of the context of the document. For example, a page may be dedicated to Shakespeare in general and has not much relevance in terms of the Shakespeare's drama Hamlet. The onus to find the correct web page hence rests on the human reader who must not only provide the correct keywords while searching, but also go through (read and understand) the web pages that are shown by the web engine, in order to find the web page that has the required information.

Search engines also display the results of a search within snippets, which are sentences that contain the searched keyword, and the sentences adjacent to these sentences. This approach, though helpful in identifying the exact sentence and the block of text around the keyword, is not helpful in identifying the overall context of the document. Thus a web search results in temporary 'Denial of Information' where the user may end up browsing a page which may consist of a single sentence that contains the keyword but has no relation to overall context of the document/web page. For example, the search on 'Beethoven' may lead to a blog where some blogger has watched the movie by the same name, though the search was intended for 'Beethoven the Composer'.

Some search engines also search the structure of the web pages and provide the starting sentences of each paragraph of the web page. This approach though helpful does not capture the essence of the document, as it concentrates on the titles/heading and not on the semantics of the entire content of the document.

Certain systems exist for calculating summary of document based on semantics of the document. However, the summary calculation is dependent on a small context of input documents, and does not take into account the massive corpus of Internet, and hence does not consider the large-scale summarization that is involved at this scale.

In the case of networks such as Internet, the transfer of large number of semantically irrelevant documents for consumption by humans results in waste of network bandwidth.

Thus these systems do not prevent 'Denial of Information' where the human reader is flooded with information in form of hundreds of documents or web pages that may not be relevant, thus resulting in wastage of user, network bandwidth and client/server computing time.

All these systems lack the ability to provide more detailed document search by taking into account a large corpus of documents and providing a fast, concise, complete and understandable document content summary that enable the human reader to quickly analyze the document semantically, and move over to the next document.

Accordingly, a need exists for a method and system which provides semantically generated meta-data i.e. summary or semantic excerpts for a document, using a large corpus that can be used effectively by human readers in quickly understanding the context of the document, thus preventing a 'Denial of Information' and loss of computing and network resources.

SUMMARY OF THE INVENTION

In accordance with the present invention, there is provided a method and system for semantically generating meta-data for a document that can be used effectively by man or machine readers in quickly understanding the context of the document, thus preventing a 'Denial of Information'. The invention also improves usage of computing and network resources.

For instance, one embodiment of the present invention provides a method and system for generating the contextually important sentences of a document by comparing that document against contextually similar documents. These key sentences then form the semantic summary of the document. These summaries are stored along with the document or its Uniform Resource Identifier, so that they can be retrieved whenever the document is retrieved.

In one embodiment, the semantic groups of a language (such as words with similar meanings) as found in a given taxonomy such as a thesaurus are assigned unique-identifiers such as prime numbers signifying their uniqueness. Thus a given language is converted into a database of unique-identifiers, which are associated with the root words of the provided taxonomy. These root words themselves are then associated with words that carry similar meaning though in different nuance.

In another embodiment, the taxonomy arranges similar concepts together, thus similar concepts have unique-identifiers that are close to each other creating a semantic-group. It is obvious that representing semantic concepts of a language through unique-Identifiers allows for symbolic and mathematical manipulation. Thus same identifiers can be used for different languages to denote similar concepts. In this entire process, common words like—'the, is, was, then, that' etc. are ignored.

For example, let us consider prime numbers used as unique-identifiers, a thesaurus used as a means of taxonomy, and English as the language in consideration. The concept word 'blue' (and the associated words like 'bluish') is assigned the identifier prime 2, and, the concept word 'color' (and the associated semantically similar words like 'hue', 'tinge' etc.) is assigned the identifier—prime number 3, and the thesaurus word 'sky' is assigned the identifier—prime number 5. These prime numbers are then used to generate a semantically unique mathematical/symbolic sequence called the 'sentence number', which is later assigned with weights. For example, the sentence—'The color of sky is blue', will be assigned the semantic number of 30 based on the multiplication of 3 (color), 2 (blue), and 5 (sky).

Multiplication is just one of the ways of generating the sentence number. These identifiers can also be arranged in a sequence like 325 or anything similar.

It is to be noted that these examples are for the purpose of explaining the concept and should not be taken as a limitation on the proposed invention.

The unique-identifiers assigned to the words cover an entire category of words. For example, 'bluish' is also assigned the prime number 2. Hence the sentence, 'The sky has a bluish tinge', is considered as semantically equivalent to the earlier sentence—'The color of sky is blue', and is therefore assigned the same unique-identifier (for example 30). This approach is helpful in summarizing documents where the number of sentences needs to be reduced drastically and to convey the meaning of the document in very few sentences.

In another embodiment, the documents are indexed using a search engine. Each document is then retrieved using the search engine. The words of the preprocessed document are again used as search entries in the search engine. The retrieved results provide snippets of the text containing the provided search word.

These snippets provide an indication of the context in which that particular word is used.

In an embodiment of the invention, these snippets are clustered to find out the number of clusters for a given word. The number of clusters for a word indicates the nuances that exist for that particular word.

In an embodiment, the weight of a given unique-identifier corresponding to a word is calculated by using the following formula, $$\text{global unique-identifier-weight} = \log((\text{total number of documents}/\text{number of documents in which the word is found})*(1/\text{Total number of clusters in which word is found})).$$

The given global unique-identifier-weight advantageously provides information about the nuances that exist for a given word. The more the number of nuances that exist for a word, the less is its weight.

In another embodiment, the weight of a unique-identifier for a given input document is calculated by using the local frequency of the unique-identifier and the global unique-identifier-weight.

In one embodiment, a document's summary is generated by using a database of other documents. This database of documents is processed to cluster documents contextually similar to the input document. This database can be a search engine database but not limited to it.

In another embodiment, since a search for unique-identifiers/root words in a semantic-structure (for example a sentence, paragraph, tags, key words etc. are semantic structures since they give information about the meaning of a document) can result in unique-identifiers/multiple words with multiple and redundant meanings, the unique-identifiers in a given semantic-structure are checked with the unique-identifiers in the next semantic-structure, and only those unique-identifiers are selected for a given semantic-structure which have unique-identifiers from the same semantic groups in the next sentence. This ensures that multiple meanings that can get associated with a semantic-structure are removed.

For example, if the first sentence is—"I went with my office colleagues for entertainment". If the second sentence is—"We saw a movie and then had dinner at a restaurant". Then in the first sentence, the words that will be looked up in the primes database are 'office', 'colleagues' and 'entertainment'. In the second sentence, the actual entertainment is described through 'movie', 'dinner' and 'restaurant'. Thus the particular nuance of the word 'entertainment' where it pertains to 'movies, drama, music' etc will be picked up.

However, if the first sentence is—'The people at my office were entertaining the idea of moving to a new location', and the second sentence is—'The location most probably will be in the downtown'. Then the word 'entertaining' has a meaning different from watching 'movies' or having 'dinner' at a 'restaurant'. Thus this particular meaning of entertainment and hence the associated unique-identifier will not be taken into consideration. Thus the unique identifier associated with the secondary meaning of 'entertaining' i.e. 'to consider' will be taken into account.

In another embodiment, an input document's (to be summarized) associated semantic-structure (for example a sentence, paragraph, tags, key words etc. are semantic structures since they give information about the meaning of a document) are then identified and assigned weights also referred to as semantic-structure-weights based on the weights of the unique-identifiers for the constituent words.

In an embodiment, the semantic-structures with the optimal weights are selected as candidates for generation of summary.

In another embodiment, the document is processed to extract the headers and titles semantically and structurally placement-wise important content to generate summary based on the structure of the document. For example, the first paragraph, the last paragraph, the first and last sentences of each paragraph are also extracted to generate structure-based summary.

In yet another embodiment, this structure-based summary is compared with the summary generated using unique-identifiers, and the common semantic-structures put into a single list.

In another embodiment, these semantic-structures are classified based on the entropy of the semantic-structures. For example, in one of cases if the number of unique-identifiers in a semantic-structure is higher for a very small number of words then that sentence is supposed to have higher entropy.

These entropy parameters are used to identify the large/complex and small/simple sentences for a document. This information is then used to generate simple summaries for easier consumption by a human reader.

In another embodiment, the entropy of a semantic-structure is calculated based on the size of the sentence in terms of number of words and the number of unique-identifiers (i.e. unique concepts) found in the sentence, and the total number of sentences that are available in a document.

In yet another embodiment, the semantic-structures are parsed using Natural Language Processing (NLP) techniques for finding out the possible grammatical parts of the sentence.

In one embodiment, the complex/long semantic-structures of a particular document are replaced by the contextually similar but simpler/smaller semantic-structures from other documents, if they have the same subject, and have at least the same unique-identifiers.

In yet another embodiment, sentences derived from different parts of the document are grouped together if they are semantically similar. For example. this can be done by calculating cosine similarity of sentences or by any other known method.

In another embodiment, the semantic-structures (i.e. sentences, paragraphs etc.) that are identified to contain the key unique-identifiers are again used for searching similar semantic-structures in the database. The similar semantic-structures are then used to substitute existing sentences to generate an alternative summary.

In an embodiment, a 'topic summary' is generated by using the summary of all similar documents and optionally a user provided summary. A topic summary provides an insight into the subject matter of the input documents.

In another embodiment, the context used for summary generation is based on user preferences. Therefore, the context can be local machine/Internet and is stored on a database.

In yet another embodiment, the length of summary can be selected by changing the threshold value, which allows summary from one sentence to multiple sentences. In another embodiment, the summary can be reformatted for representation in various ways based on user preferences, the structure in which the summary is stored, and the location that it is stored. Thus the summary can be stored as part of the electronic data or stored along with the Uniform Resource Identifier (URI) of the electronic data.

In another embodiment, the summary can be used in a semantic browser/search engine/resource locator that fetches summary of a document when the corresponding URI/keywords is provided, and allows display of summaries in user-preferred format.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components and circuits have not been described in detail as not to unnecessarily obscure aspects of the present invention.

Notation and Nomenclature

Some portions of the detailed descriptions, which follow, are presented in terms of procedures, logic blocks, processing and other symbolic representations of operations on data bits within a computer system or electronic computing device.

These descriptions and representations are the means used by those skilled in the data processing arts to most effectively convey the substance of their work to others skilled in the art. A procedure, logic block, process, etc., is herein, in generally, conceived to be a self-sequence of steps or instructions leading to a desired result.

The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device.

For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "generating" or "modifying" or "retrieving" or the like refer to the action and processes of a computer system, or similar electronic computing device that manipulates and transforms data. For example, the data is represented as physical (electronic) quantities within the computer system's registers and memories and is transformed into other data similarly represented as physical quantities within the computer system memories or registers or other such information storage, transmission, or display devices.

Generation of Context Based Summary

The method and system of the present invention provide for the generation of document summary is provided. According to the exemplary embodiments of the present invention, the system is implemented to suite the requirements of a user who is searching for documents and does not have the time to read the entire document before judging that it is suitable for the user's purposes. Thus, according to such embodiments, it is possible to generate a document summary based on contextually similar documents that are available either with the user or on the Internet.

According to one embodiment, an initial taxonomy is created. This taxonomy is language independent. The different root words in this taxonomy are assigned unique identifiers such as prime numbers.

In an embodiment of the invention, the words are then associated with unique identifiers. It will be clear to one skillful in the art, that these unique-identifiers actually represent semantic concepts of a language. However, these unique-identifiers (for example prime numbers) are subject to easier manipulation as compared to words.

In another embodiment, weights are assigned to individual unique-identifiers based on the nuances of meaning that they exhibit in the corpus of initial documents.

In another embodiment, the list of unique-identifiers associated with a sentence is pruned by searching for similar unique-identifiers that occur in the adjacent sentences. This search removes words with polysemy i.e. words with similar roots and having somewhat similar meanings.

According to another embodiment, the sentences of document to be summarized are extracted, and each sentence is assigned a weight based on the weights of the constituting unique-identifiers (i.e. the words).

In another embodiment, an entropy function is used to find sentences that have less number of words in it and high number of high frequency unique-identifiers in them. The actual number of sentences available is also an input to this function. As a result of this entropy calculation, the sentences that are complex and convey less meaning are removed from the list.

In another embodiment, Natural Language Processing (NLP) is done over the sentences to identify the subject of the sentences.

In another embodiment, NLP is used only used optimally (for example at the end of summary generation) since NLP techniques are computationally expensive.

In yet another embodiment, similarity of sentences is calculated using standard techniques. This is to provide some coherence to the summary that is generated from different parts of the document.

According to one embodiment, the structure of the document is analyzed to give a separate summary, and the summary obtained is combined with the summary generated earlier.

According to another embodiment, the summary is stored in the database along with the Uniform Resource Identifier (URI) of the document. This database can then be used to display summaries of document.

According to another embodiment, these summaries may get updated as more documents get added to the database and the current context is changed.

According to another embodiment, the document summaries can be generated to a given level of detail. The level of detail is given by the number of sentences that are allowed in the user preferences.

Exemplary System in Accordance with
Embodiments of the Present Invention

Figure 1:
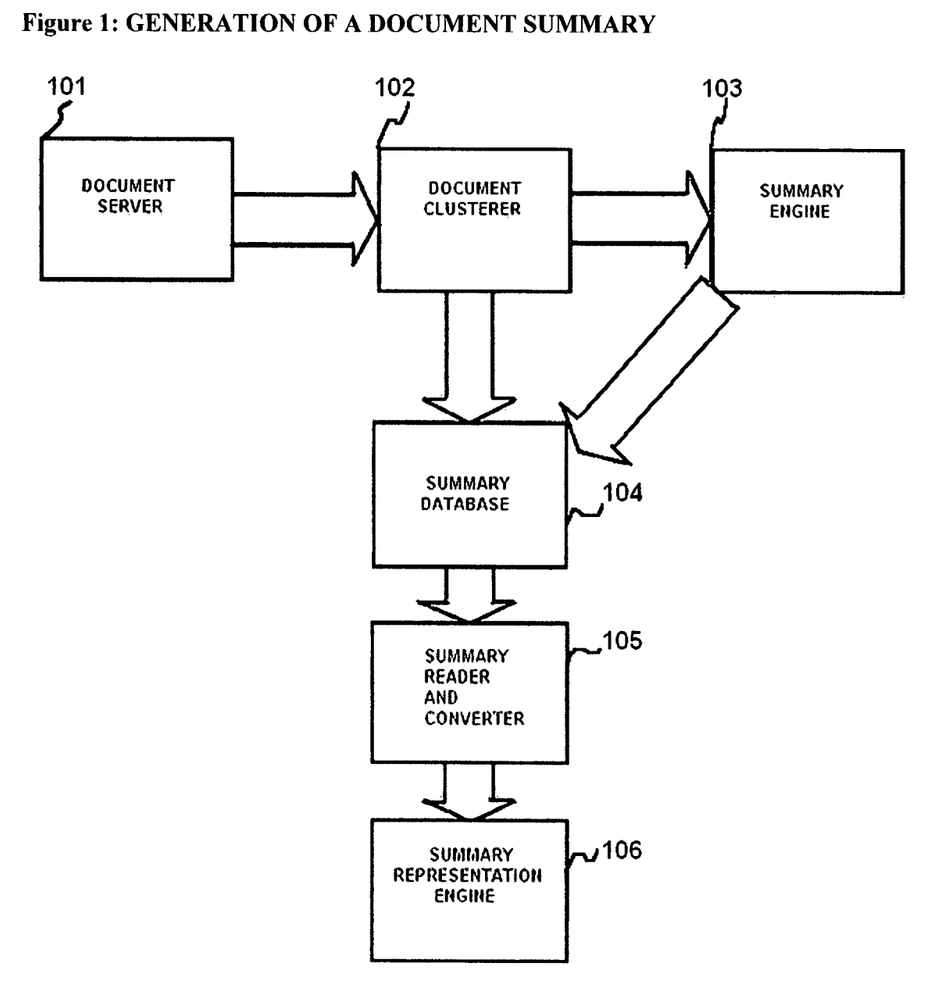
FIG. 1 is a block diagram illustrating various processing parts used during the generation of a document summary.

FIG. 1 represents a summary generation system according to one embodiment of the present invention. Referring to FIG. 1, there is shown a document server 101 that holds all the documents (which serve as input for generating the summary of a document which may or may not belong initially to the document server), a document clusterer 102 that clusters the documents, a summary engine 103 for generating summary of document, a summary database 104 for storing summaries, a summary reader (retriever) and converter 105 that converts the summary from the database format to a format required by the application, a summary representation engine 106 that uses the formatted summary to suit the interface requirements of the application.

According to one embodiment, the document clusterer 102 takes the documents stored in document server 101, generates summaries through summary engine 103 and stores the summary in summary database 104. The summary reader and converter 105 is used to retrieve the summaries from the database and convert them to a required format, which is then used by the Summary Representation Engine 106 to display the summary.

According to one embodiment, the summary engine 103 is also responsible for creating taxonomy of concepts and assigning unique-identifier to the different root words.

According to another embodiment, the summary engine 103 also generates a 'topic summary' by taking into account all similar documents.

According to one embodiment, summary reader and converter can convert the summary to be consumed either by humans or by machines. For humans, the summary is in the form of a User Interface. In case of a machine, the summary is in the form of an openly available and understood structure.

Figure 2:
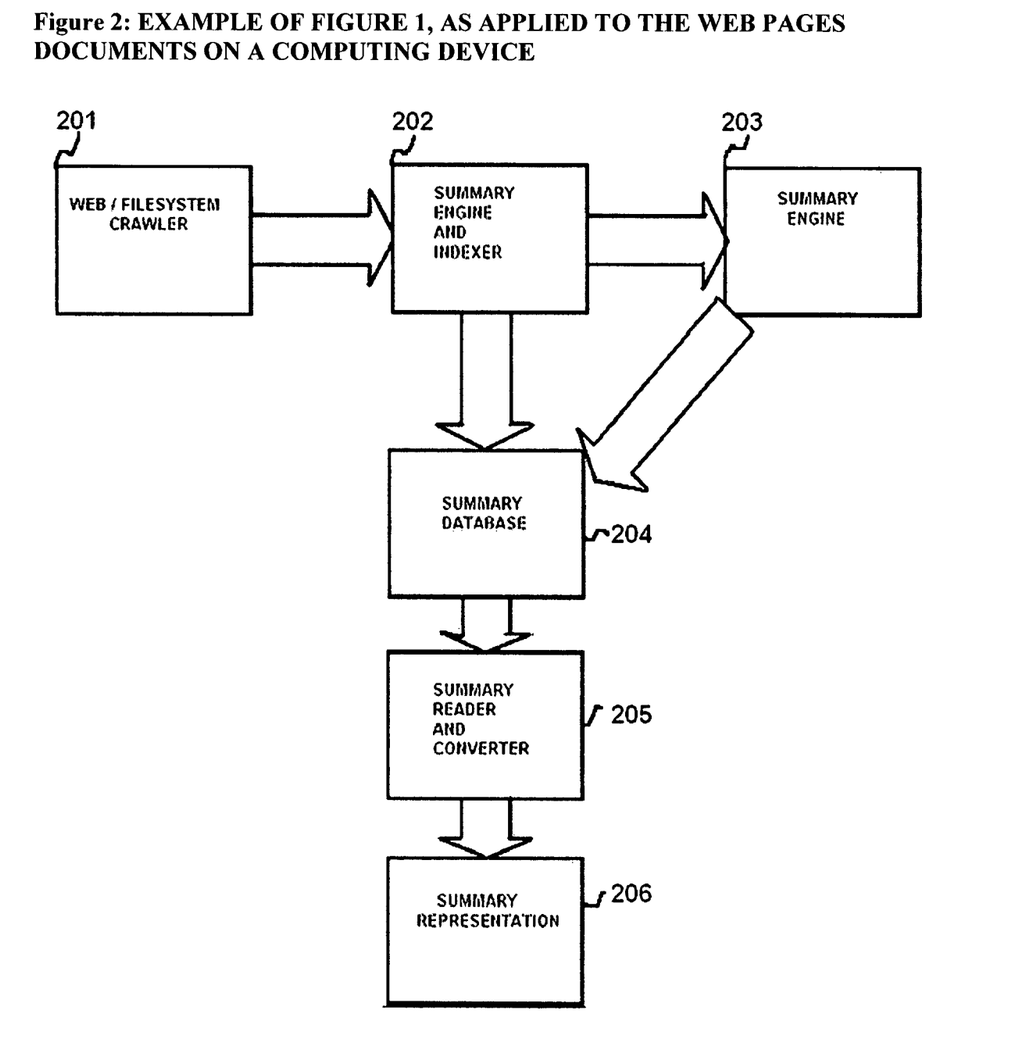
FIG. 2 is a block diagram illustrating an example of summary generated for a web page.

FIG. 2 is an example of the FIG. 1 as applied to web pages or files on a computing device.

Referring to FIG. 2, there is shown a web crawler 201 that crawls the internet and downloads documents, the 'Search Engine and Indexer' 202 that clusters various documents that were indexed by 201, a summary engine 203 for generating summary of document, a summary database 204 for storing summaries, a summary reader (retriever) and converter 205 that converts the summary from the database format to a format required by the application, a summary representation engine 206 that uses the formatted summary to suit the interface requirements of the application. According to one embodiment, the search engine 202 takes the documents input by the web crawler 201, generates summaries through summary engine 203 and stores the summary in summary database 204. The summary reader and converter 205 is used to retrieve the summaries from the database and converts it a to a required format, which is then used by the Summary Representation Engine 206 to display the summary.

Figure 3:
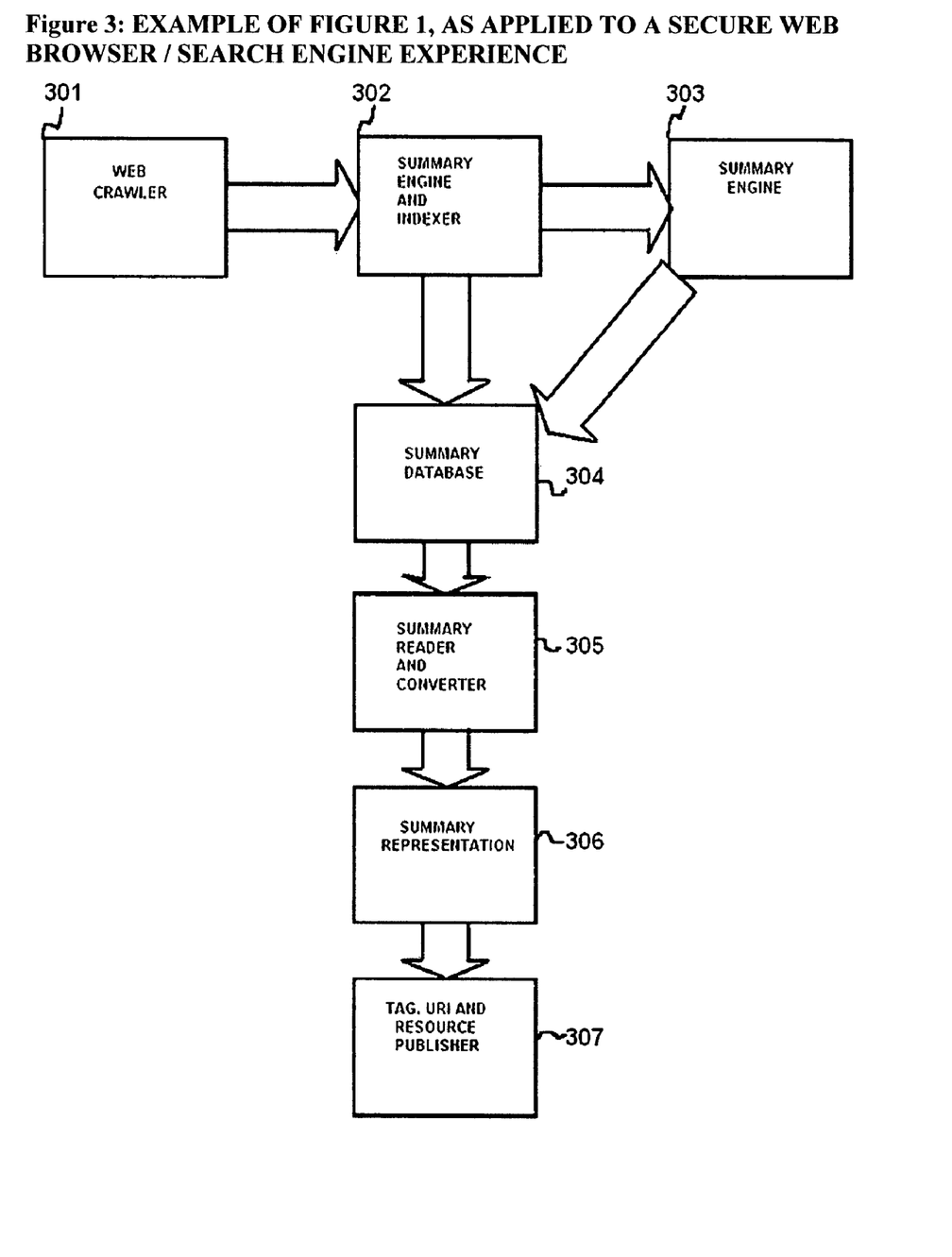
FIG. 3 is a block diagram illustrating an example of summary generated for a web-based document (web page) that is useful in terms of preventing 'Denial of Information'.

FIG. 3 is an example of the FIG. 1 as applied to a secure web browser/search engine experience i.e. with no 'Denial of Information', where the browser/search engine/document explorer displays the summary tag of a URI/file/resource to allow a user to decide to read the web page/file/resource associated with the Uniform Resource Identifier (URI) or reject it.

Referring to FIG. 3, there is shown a web crawler 301 that crawls the internet and downloads documents, the 'Search Engine and Indexer' 302 that clusters various documents that were downloaded by 301, a summary engine 303 for generating summary of document, a summary database 304 for storing summaries, a summary reader (retriever) and converter 305 that converts the summary from the database format to a format required by the application, a summary representation engine 306 that uses the formatted summary to suit the interface requirements of the application, and a Tag and URI Publisher 307.

According to one embodiment, the search engine 302 takes the resources input by the web crawler 301, generates summaries through summary engine 303 and stores the summary in summary database 304. The summary reader and converter 305 is used to retrieve the summaries from the database and converts it a to a required format, which is then used by the Summary Representation Engine 306 to create tags. These tags are then associated with URIs by the 'Tag Publisher'.

According to one embodiment, a user's browser/search engine/Resource Locator then interacts with the published URIs when retrieving content from different web sites/resource depositories or during searching. The browser/document explorer/resource locator then displays the summary of the URI, so that user can decide to further continue reading/evaluating the page/document/resource or avoid going to the web page altogether.

According to one embodiment, the URIs/Resource and the tags are available on a server on the internet where they can be accessed by either search engines or by user browser's to display the summary of the URI/Resource, to prevent loss of user time and computing resources spent on reading over the entire document.

Figure 4:
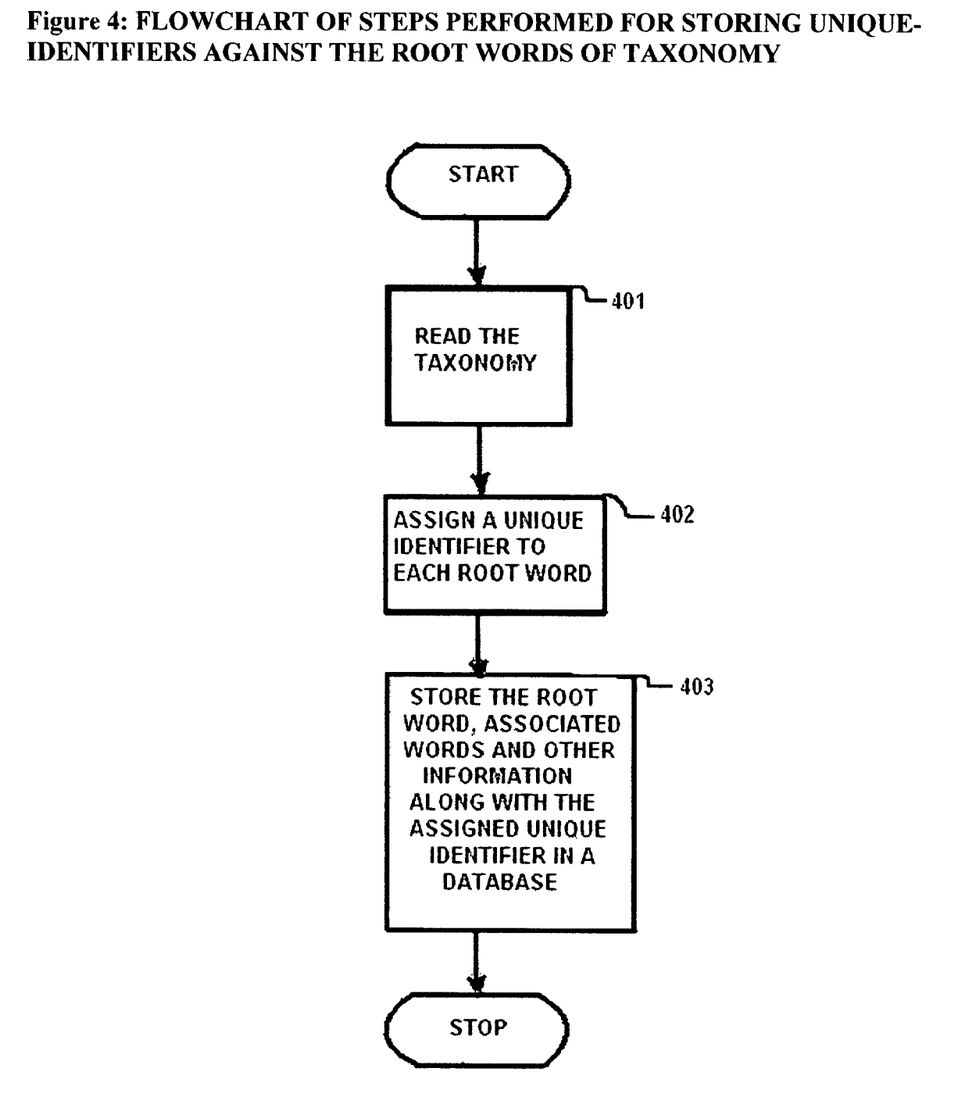
FIG. 4 is a flowchart of steps performed during assigning unique identifiers to the taxonomy.
Figure 5:
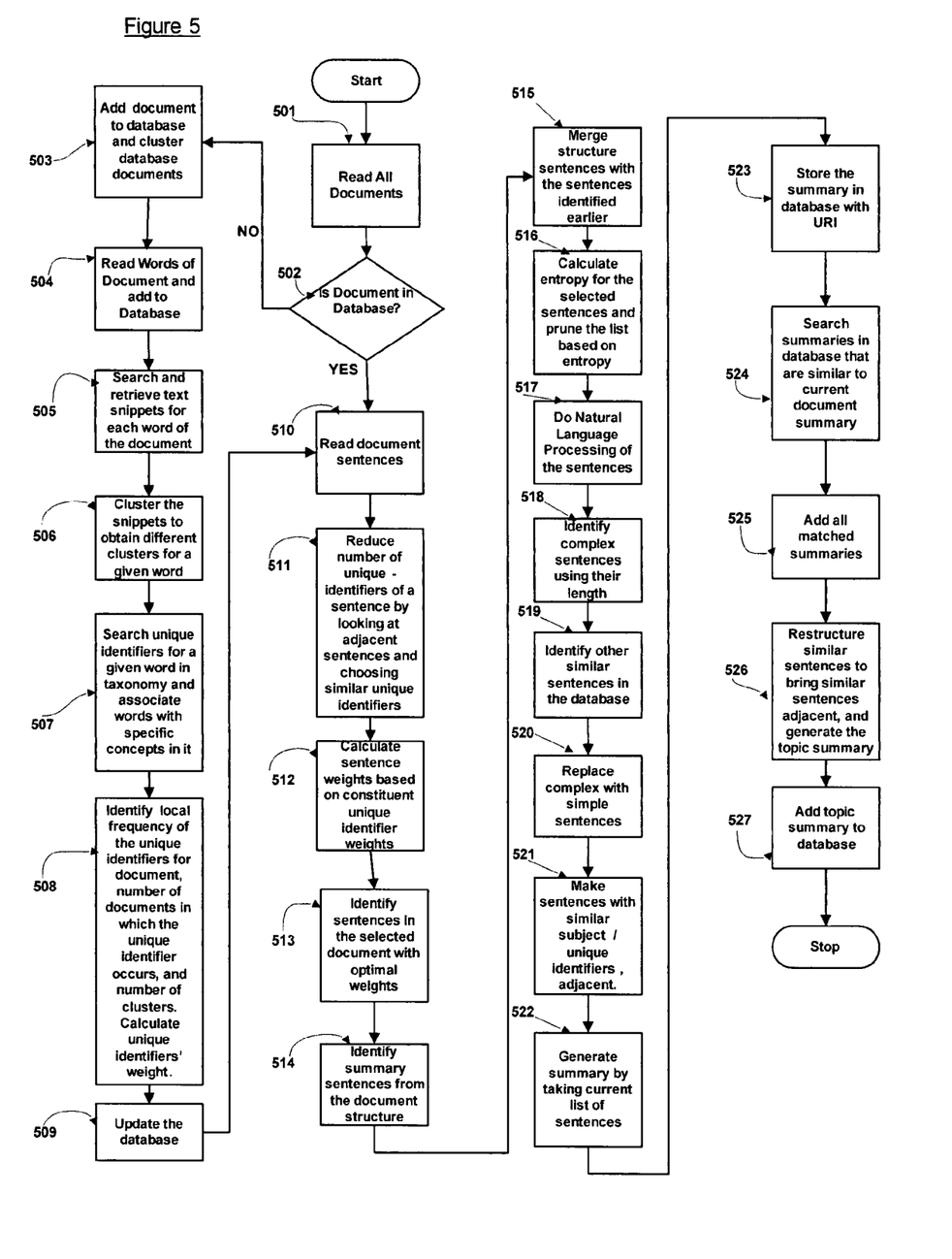
FIG. 5 is a flowchart of steps performed for generating the summary of any document (regular document, for web pages, for generating summary information for prevention of 'Denial of Information').
Figure 6:
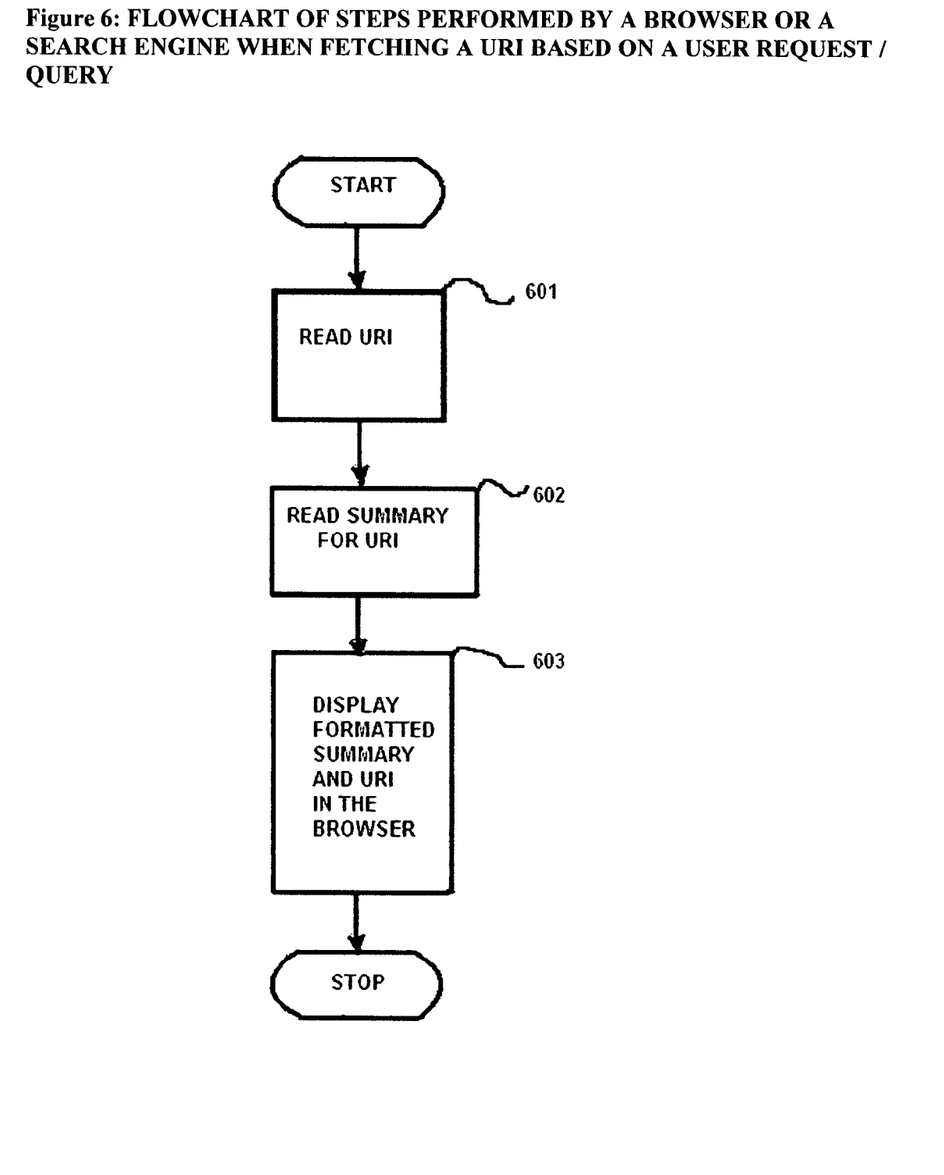
FIG. 6 is a flowchart for the steps performed by a browser or a search engine in using the summary information.

Exemplary Operations in Accordance with Embodiments of the Present Invention FIGS. 4 to 6 are flowcharts of computer-implemented steps performed in accordance with one embodiment of the present invention for providing a method or a system for generating context based summary of documents. The flowcharts include processes of the present invention, which, in one embodiment, are carried out by processors and electrical components under the control of computer readable and computer executable instructions. The computer readable and computer executable instructions reside, for example, in data storage features such as computer usable volatile memory (for example: 704 and 706 described herein with reference to FIG. 7). However, computer readable and computer executable instructions may reside in any type of computer readable medium. Although specific steps are disclosed in the flowcharts, such steps are exemplary. That is, the present invention is well suited to performing various steps or variations of the steps recited in FIGS. 4 to 6. Within the present embodiment, it should be appreciated that the steps of the flowcharts may be performed by software, by hardware or by any combination of software and hardware.

Association of Unique-Identifiers with Concepts (Root Words of a Taxonomy)

FIG. 4 consists of the steps performed for storing unique-identifiers against the root words of taxonomy. Referring to FIG. 4, at step 401, the words of taxonomy are read. At step 402, a unique-identifier is assigned to each of the root words. At step 403, the unique numbers, the root words and the associated words are stored in the database.

The Summary Engine—Generation, Storage and Presentation of Summary

FIG. 5 consists of the steps performed by the summary engine in order to generate the document summary and the topic summary.

In step 501, all the documents are read from the database. If the input database is not available in the database then it is read and added to the database in 502 and 503. The documents are then clustered using standard clustering techniques in step 503. The words of the input document are read in step 504. In steps 505, the words of the document are searched in the database to identify sentences in which the word occurs ('text snippets'). These sentences or text snippets are clustered to obtain different clusters for a given word of the document in step 506.

In step 507, the unique-identifiers associated with the given word are identified.

In step 508, the local frequency of each word is calculated. Other variables such as the number of text snippet clusters for each word and the number of documents in which a word occurs is also calculated. Weight of each associated unique-identifier is calculated based on the aforementioned variables.

In step 509, the weights of each unique-identifier are updated in the database. In step 510, the document sentences are read. In step 511, the number of 'unique-identifiers' associated with each word of the sentence is reduced by comparing against the adjacent sentences. If the adjacent sentences have 'unique-identifiers' that are similar, then those 'unique-identifiers' are selected, otherwise the 'unique-identifiers' are removed from the sentence.

In step 512, the weights of the each sentence of the document is calculated by using the individual unique-identifier weight. In step 513, the sentences with optimal weights are identified.

In step 514, the input document is used to identify the sentences that may form the summary based on the structure of the document. In step 515, the sentences from the previously created list are merged with sentences that are created during structural summarization.

In step 516, the entropy of the sentences is calculated, and sentences are selected/rejected based on the entropy value. This makes the summary list shorter. In step 518, the list of sentences is parsed by a Natural Language Parser to identify the subject of the sentences. In step 519, the complex sentences are identified based upon the number of words that they consist of.

In step 520, other similar sentences in the database are searched based upon the standard search/clustering techniques such as cosine similarity. In step 521, if the sentences found in the database are simpler and have equivalent number of unique-identifiers then the existing sentence is replaced by the simpler sentence.

In step 522, the sentences that have a common subject or are similar are brought together to make them adjacent. This is done to bring cohesion to the group of sentences that are from different parts of a document and hence may lack connection.

In step 523, the current list of sentences is joined together to form a document summary.

In step 524, the summary is stored in the database along with a URI (Uniform Resource Identifier) or any other indicator.

In step 525, the existing database of summaries is searched for similar summaries using standard similarity techniques. User provided summaries can also be used.

In step 526, all the matched summaries are combined. One of the means to perform this step is a simple concatenation of summaries.

In step 527, a topic summary is generated by using standard similarity calculations to make different sentences of the topic summary adjacent.

The topic summary is added to the database in step 528.

Browser/Search Engine Fetching of Summary

FIG. 6 consists of the steps performed by a browser or a search engine when fetching a URI based on a user request/query. In step 601, URI is received from the user and the URI is identified. In step 602, the summary based on the URI is fetched from a server where the URI along with the associated summary was published. In step 603, the browser/search engine displays the formatted summary of the URI fetched enabling the user to make a quick decision whether to further analyze the URI or not.

Exemplary Hardware in Accordance with Embodiments of the Present Invention

Figure 7:
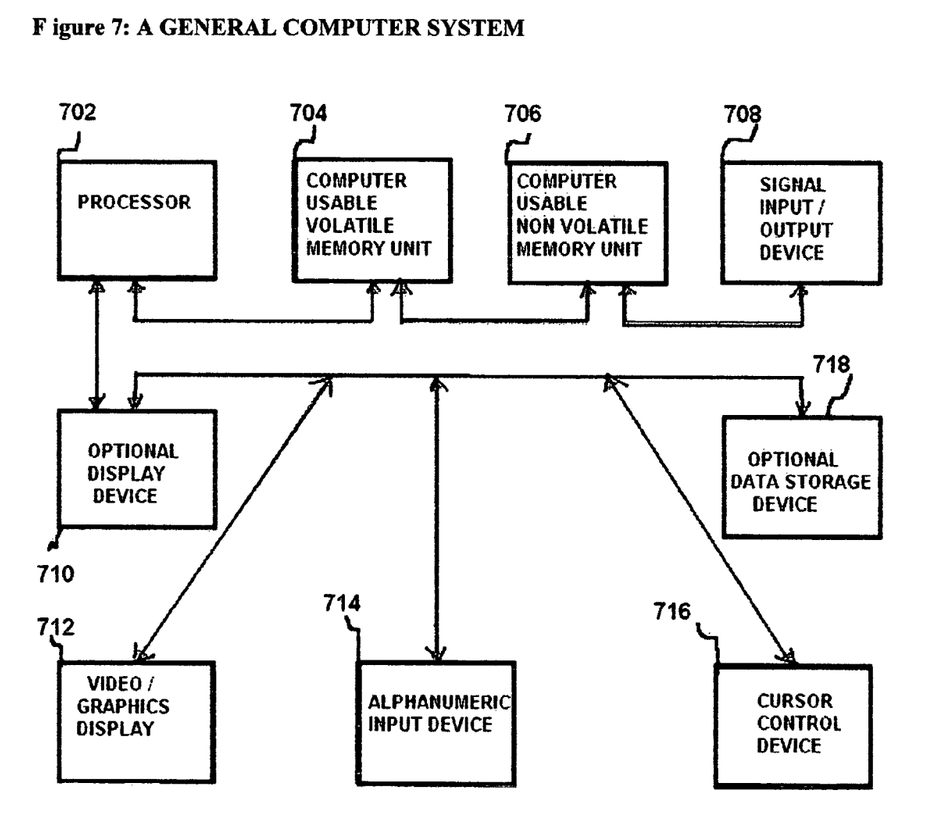
FIG. 7 is a block diagram of an embodiment of an exemplary computer system used in accordance with one embodiment of the present invention.

FIG. 7 is a block diagram of an embodiment of an exemplary computer system 700 used in accordance with the present invention. It should be appreciated that the system 700 is not strictly limited to be a computer system. As such, system 700 of the present embodiment is well suited to be any type of computing device (for example: server computer, portable computing device, mobile device, embedded computer system, etc.). Within the following discussions of the present invention, certain processes and steps are discussed that are realized, in one embodiment, as a series of instructions (for example: software program) that reside within computer readable memory units of computer system 700 and executed by a processor(s) of system 700. When executed, the instructions cause computer 700 to perform specific actions and exhibit specific behavior that is described in detail below.

Computer system 700 of FIG. 7 comprises an address/data bus 710 for communicating information, one or more central processors 702 couples with bus 710 for processing information and instructions. Central processing unit 702 may be a microprocessor or any other type of processor. The computer 700 also includes data storage features such as a computer usable volatile memory unit 704 (for example: random access memory, static RAM, dynamic RAM, etc.) coupled with bus 702, a computer usable non-volatile memory unit 706 (for example: read only memory, programmable ROM, EEPROM, etc.) coupled with bus 710 for storing static information and instructions for processor(s) 702. System 700 also includes one or more signal generating and receiving devices 708 coupled with bus 710 for enabling system 700 to interface with other electronic devices. The communication interface(s) 708 of the present embodiment may include wired and/or wireless communication technology. For example, in one embodiment of the present invention, the communication interface 708 is a serial communication port, but could also alternatively be any of a number of well known communication standards and protocols, for example: Universal Serial Bus (USB), Ethernet, FireWire (IEEE 1394), parallel, small computer system interface (SCS), infrared (IR) communication, Bluetooth wireless communication, broadband, and the like.

Optionally, computer system 700 can include an alphanumeric input device 714 including alphanumeric and function keys coupled to the bus 710 for communicating information and command selections to the central processor(s) 702. The computer 700 can include an optional cursor control or cursor-directing device 716 coupled to the bus 710 for communicating user input information and command selections to the central processor(s) 702. The system 700 can also include a computer usable mass data storage device 718 such as a magnetic or optional disk and disk drive (for example: hard drive or floppy diskette) coupled with bus 710 for storing information and instructions. An optional display device 712 is coupled to bus 710 of system 700 for displaying video and/or graphics.

As noted above with reference to exemplary embodiments thereof, the present invention provides a method and system for generating summaries for different kinds of document. The method and system provides for generation of summary, its publication in a suitable format, its usage as a document's metadata, and its usage in preventing denial of information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of invention and its practical application, to thereby enable others skilled in the art to best utilize the invention and various embodiments with various modifications as are suited to the particular use contemplated. It is intended that the scope of the invention to be defined by the claims appended hereto and their equivalents.

What is claimed is:

1. A method comprising:
   a. generating a context from a plurality of electronic data and from the taxonomy of semantic concepts that exist in the said electronic data, wherein said electronic data is obtained using a plurality of sources that at least include: using a known source or using Internet,
   b. assigning unique-identifiers to each said semantic concept,
   c. refining the context by generating the taxonomy, wherein the said taxonomy is generated by grouping unique-identifiers of similar concepts together to form a semantic-group,
   d. assigning weights to said unique-identifiers based on said electronic data and the said taxonomy,
   e. extracting important semantic structures of an electronic data to be summarized by calculating semantic structure weights based on said weights of said unique-identifiers in the said context thereby forming a summary,
   f. associating said summary to said electronic data and retrieving the said summary instead of the said electronic data,
   whereby said summary prevents information overload when plurality of electronic data is available.

2. The method of claim 1, wherein said summary is generated by using a semantic-structure-list that is created by merging the semantic structures obtained by: calculating semantic-structure-weight of individual semantic-structures from the said unique-identifier weights in the said context, and by creating a list of semantic-structures with optimal weights; and, selecting text based on the structure of the electronic data to be summarized.

3. The method of claim 2, wherein the semantic-structure-list generation further comprises: selection of unique-identifiers in a semantic-structure that at least are also present in adjacent semantic-structures and belong to the same semantic-group whereby adjacent semantic-structures have related meaning, and whereby the adjacency of semantic structures is based on the location of the said adjacent structures within the document; calculating said semantic-structure-weight using the constituent unique-identifiers' weights and the local frequency of the unique-identifiers in said electronic data to be summarized; pruning of said semantic-structure-list based on a entropy of semantic-structures that is determined based at least on number of unique-identifiers present in the semantic-structure, number of semantic-structures in the list and the length of the semantic-structure.

4. The method of claim 3, wherein the processing of the semantic-structures in said semantic-structure-list further comprises: selectively parsing the pruned semantic-structures using Natural Language Parsing techniques to identify their grammatical content for making similar semantic-structures adjacent; replacing the semantic-structures by similar semantic-structures from the context database based on multitude of factors and, adding the said semantic-structures together to form a summary.

5. The method of claim 1, wherein the storage, retrieval and usage of said summary further comprises: storing said summary in multitude of ways that at least include storage in a database against a Universal Resource Identifier and embedding in the structure of said electronic data to be summarized; re-formatting of said summary for suitable access by resource locators/search engines/browsers, and for display on request whereby saving user time and computing resources; displaying said summary based on user preferences at least comprising of means of traversal from simpler summaries to complex summaries and from one summary to another using associated Uniform Resource Identifiers; storing said summary on a server and using the said summary in a multitude of ways that at least include searching summaries based on input key text; and displaying similar summaries of different electronic data by resource locators/search engines/browsers; combining said summary with at least summary of similar electronic data and user provided summary to create a topic-summary.

6. The method of claim 1, wherein the summaries generated for various documents are used as input to a search engine, which selectively indexes the summaries instead of actual documents and uses the words in the summary as an input, whereby using the generated index to access the actual documents.

7. A system comprising:
   a. means configured for generating a context from a plurality of electronic data and from the taxonomy of semantic concepts that exist in the said electronic data, wherein said electronic data is obtained using a plurality of sources that at least include: using a known source or using Internet,
   b. means configured for assigning unique-identifiers to each said semantic concept,
   c. means configured for refining the context by generating the taxonomy, wherein the said taxonomy is generated by grouping unique-identifiers of similar concepts together to form a semantic-group,
   d. means configured for assigning weights to said unique-identifiers based on said electronic data and the said taxonomy,
   e. means configured for extracting important semantic structures of an electronic data to be summarized by calculating semantic structure weights based on said weights of said unique-identifiers in the said context thereby forming a summary,
   f. means configured for associating said summary to said electronic data and retrieving the said summary instead of the said electronic data, whereby said summary prevents information overload when plurality of electronic data is available.

8. The system of claim 7, wherein said summary is generated by using a semantic-structure-list that is created by merging the semantic structures obtained by: means configured for calculating semantic-structure-weight of individual semantic-structures from the said unique-identifier weights in the said context, and by creating a list of semantic-structures with optimal weights; and, means configured for selecting text based on the structure of the electronic data to be summarized.

9. The system of claim 8, wherein the semantic-structure-list generation means further comprises: means configured for selecting unique-identifiers in a semantic-structure that at least are also present in adjacent semantic-structures and belong to the same semantic-group whereby adjacent semantic-structures have related meaning and whereby the adjacency of semantic structures is based on the location of the said adjacent structures within the document; means configured for calculating said semantic-structure-weight using the constituent unique-identifiers' weights and the local frequency of the unique-identifiers in said electronic data to be summarized; means configured for pruning said semantic-structure-list based on a entropy of semantic-structures that is determined based at least on number of unique-identifiers present in the semantic-structure, number of semantic-structures in the list and the length of the semantic-structure.

10. The system of claim 9, wherein the semantic-structure processing means includes: means configured for selectively parsing the pruned semantic-structures using Natural Language Parsing techniques to identify their grammatical content for making similar semantic-structures adjacent; means configured for replacing the semantic-structures by similar semantic-structures from the context database based on multitude of factors and, means configured for adding them the semantic-structures together to form a summary.

11. The system of claim 7, wherein the storage, retrieval and usage means of said summary includes: means configured for storing said summary in multitude of ways that at least include storage in a database against a Universal Resource Identifier and embedding in the structure of said electronic data to be summarized; means configured for re-formatting of said summary for suitable access by resource locators/search engines/browsers, and for display on request whereby saving user time and computing resources; means configured for displaying said summary based on user preferences at least comprising of means of traversal from simpler summaries to complex summaries and from one summary to another using associated Uniform Resource Identifiers; means configured for storing said summary on a server and using the said summary in a multitude of ways that at least include searching summaries based on input key text; and means configured for displaying similar summaries of different electronic data by resource locators/search engines/browsers; means configured for combining said summary with at least summary of similar electronic data and user provided summary to create a topic-summary.

12. The system of claim 7, wherein the retrieval and usage means of the summary comprises: means configured for selectively indexing summaries instead of actual documents and using the words in the summary as an input whereby using the generated index to access the actual documents.

13. A non-transitory computer-readable medium of instructions comprising:
   a. instructions for, generating a context from a plurality of electronic data and from the taxonomy of semantic concepts that exist in the said electronic data, wherein said electronic data is obtained using a plurality of sources that at least include: using a known source or using Internet, b. instructions for assigning unique-identifiers to each said semantic concept, c. instructions for refining the context by generating the taxonomy, wherein the said taxonomy is generated by grouping unique-identifiers of similar concepts together to form a semantic-group, d. instructions for assigning weights to said unique-identifiers based on said electronic data and the said taxonomy, e. instructions for extracting important semantic structures of an electronic data to be summarized by calculating semantic structure weights based on said weights of said unique-identifiers in the said context thereby forming a summary, f. instructions for associating said summary to said electronic data and retrieving the said summary instead of the said electronic data, whereby said summary prevents information overload when plurality of electronic data is available.

14. The non-transitory computer-readable medium of instructions of claim 13, wherein said summary generation comprises: instructions for using a semantic-structure-list created by merging the semantic structures obtained by: calculating semantic-structure-weight of individual semantic-structures from the said unique-identifier weights in the said context, and by creating a list of semantic-structures with optimal weights; and, instructions for selecting text based on the structure of the electronic data to be summarized.

15. The non-transitory computer-readable medium of instructions of claim 14, wherein the semantic-structure-list generation comprises: instructions for selecting unique-identifiers in a semantic-structure that at least are also present in adjacent semantic-structures and belong to the same semantic-group whereby adjacent semantic-structures have related meaning and whereby the adjacency of semantic structures is based on the location of the said adjacent structures within the document; instructions for calculating said semantic-structure-weight using the constituent unique-identifiers' weights and the local frequency of the unique-identifiers in said electronic data to be summarized; instructions for pruning of said semantic-structure-list based on a entropy of semantic-structures that is determined based at least on number of unique-identifiers present in the semantic-structure, number of semantic-structures in the list and the length of the semantic-structure.

16. The non-transitory computer-readable medium of instructions of claim 15, wherein the processing of the semantic-structures in said semantic-structure-list further comprises: instructions for selectively parsing the pruned semantic-structures using Natural Language Parsing techniques to identify their grammatical content for making similar semantic-structures adjacent; instructions for replacing the semantic-structures by similar semantic-structures from the context database based on multitude of factors and, instructions for adding the said semantic-structures together to form a summary.

17. The non-transitory computer-readable medium of instructions of claim 13, wherein the storage, retrieval and usage of said summary further comprises: instructions for storing said summary in multitude of ways that at least include storage in a database against a Universal Resource Identifier and embedding in the structure of said electronic data to be summarized; instructions for re-formatting of said summary for suitable access by resource locators/search engines/browsers, and for display on request whereby saving user time and computing resources; instructions for displaying said summary based on user preferences at least comprising of means of traversal from simpler summaries to complex summaries and from one summary to another using associated Uniform Resource Identifiers; instructions for storing said summary on a server and using the said summary in a multitude of ways that at least include searching summaries based on input key text; and displaying similar summaries of different electronic data by resource locators/search engines/browsers; instructions for combining said summary with at least summary of similar electronic data and user provided summary to create a topic-summary.

18. The non-transitory computer-readable medium of instructions of claim 13, wherein the retrieval and usage means of the summary comprises: configured for selectively indexing summaries instead of actual documents and using the words in the summary as an input whereby using the generated index to access the actual documents.

* * * * *